US007327471B2

(12) United States Patent
Tiemann (10) Patent No.: US 7,327,471 B2
(45) Date of Patent: Feb. 5, 2008

(54) APPARATUS AND METHOD FOR STABILIZING LASERS USING DUAL ETALONS

(75) Inventor: Bruce Tiemann, Longmont, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 253 days.

(21) Appl. No.: 11/066,683

(22) Filed: Feb. 25, 2005

(65) Prior Publication Data

US 2006/0192970 A1 Aug. 31, 2006

(51) Int. Cl.
*G01B 9/02* (2006.01)
(52) U.S. Cl. ..................................... 356/519; 356/454
(58) Field of Classification Search ............... 356/454, 356/480, 519; 372/28, 32
See application file for complete search history.

(56) References Cited

U.S. PATENT DOCUMENTS

| 4,947,398 A | | 8/1990 | Yasuda et al. | |
|---|---|---|---|---|
| 5,970,076 A | * | 10/1999 | Hamada | 372/20 |
| 2002/0164125 A1 | * | 11/2002 | Berger et al. | 385/39 |
| 2004/0091002 A1 | * | 5/2004 | Watterson et al. | 372/20 |

OTHER PUBLICATIONS

Hansch, T. W., Laser Frequency Stabilization by Polarization Spectroscopy of a Reflecting Reference Cavity, Optics Communications, Dec. 1980, pp. 441-444, vol. 35, No. 3.
Drever, R. W. P. et al, Laser Phase and Frequency Stabilization Using an Optical Resonator, Applied Physics B, Feb. 1983, pp. 97-105, vol. 31.
Sandford, Stephen P. et al, Laser Frequency Control Using an Optical Resonator Locked to an Electronic Oscillator, Journal of Quantum Electronics, Nov. 1997, vol. 33, No. 11.
Klimenko, S. et al, Simulation of Input Optics with LIGO End-To-End Model, internal working note of the LIGO Project LIGO-T990100-00-D, May 28, 1999, pp. 1-17, joint publication of Laser Interferometer Gravitational Wave Observatory (LIGO) by California Institute of Technology, Pasadena, CA, USA and Massachusetts Institute of Technology, Cambridge , MA, USA.
Ma, Long-Sheng et al, Ultrasensitive Frequency-Modulation Spectroscopy Enhanced by a High-Finesse Optical Cavity: Theory and Application to Overtone Transitions of C2H2 and C2HD, Journal of Optical Society America B, Dec. 1999, pp. 2255-2268, vol. 16, No. 12.
Slagmolen, B. J. J., et al, Frequency Stability of Spatial Mode Interference (Tilt) Locking, IEEE Journal of Quantum Electronics, Nov. 2002, pp. 1521-1528, vol. 38, No. 11.

* cited by examiner

*Primary Examiner*—Hwa (Andrew) Lee
(74) *Attorney, Agent, or Firm*—McDermott Will & Emery LLP (57) ABSTRACT

Method and apparatus are disclosed that enable lasers to be stabilized in frequency to a high precision while simultaneously enabling rapid re-acquisition of stabilization control loops in the event of frequency locking loss. The principle of operation is to incorporate two etalons, one having a high finesse for frequency high stability, and one having a low finesse for wide error signal locking range, and electronics that pass control between two control systems in such a manner that any loss of frequency locking is rapidly reacquired.

14 Claims, 9 Drawing Sheets

APPARATUS AND METHOD FOR STABILIZING LASERS USING DUAL ETALONS

BACKGROUND TO THE INVENTION

1. Field of the Invention

The present invention relates to methods and apparatus for frequency stabilizing lasers. In particular, the present invention relates to lasers stabilized by dual etalons.

2. Discussion of Background Art

Lasers are used in many applications where the oscillation frequency of the device is utilized as a clock. At the extreme end of applications the demonstration of stabilities better than 1 part in $10^{14}$ enables lasers to be used to synchronize clocks worldwide for highly precise time measurements. These systems require an extremely high degree of isolation against environmental disturbances (such as temperature variations and vibrations) since even minute changes in the length of laser cavities causes variations in the laser frequency. Stable lasers are also required in applications such as coherent laser radar systems. In these systems laser pulses are sent from a sensor location to a target that may be many km distant and the change in phase of the signal upon return to the sensor is used to measure properties of the target. Such measurements rely on measuring the phase very accurately by heterodyning the return signal with a local oscillator beam and comparing that phase with a similar measurement carried out on a sample of the transmitted laser pulse. If there is a change in the local oscillator frequency while the pulse is in transit to the target and back, these phase measurements can become invalid. For an order of magnitude estimate of stability requirements in these circumstances it is noted that phase errors must be $<<\pi$ radians over the round-trip time $t=2R/c$, where R is the target range and c is the speed of light$=3 \cdot 10^8$ m/s. For a target range of 50 km the round-trip time is 0.33 μsec giving an angular frequency stability requirement of $<<\pi/0.33$ ms, or a frequency stability of $\Delta f=1.5$ kHz. For a laser with an emission wavelength $\lambda=1.5$ μm the frequency is given by $f=c/\lambda=2 \cdot 10^{14}$ Hz, thus leading to a fractional frequency stability requirement of $\Delta f/f=7.5 \cdot 10^{-12}$. To further put this into context the frequency of a laser determined by a standing wave formed in an optical cavity of length L whose resonant frequency is a multiple m of the quantity c/2 L (assuming the cavity is a vacuum). Changing the cavity length by a small amount $\Delta L$ causes a frequency deviation magnitude given by $|\Delta f|/f=\Delta L/L$. For a cavity length of 1 cm, a frequency of $2 \cdot 10^{14}$ Hz, and a frequency stability requirement of 1.5 kHz, the tolerance on the length $\Delta L$ is then $7.5 \cdot 10^{-14}$ m, or 0.000075 nm, an extraordinarily small number given that, for example, the diameter of a hydrogen atom is approximately 0.1 nm.

Over the years techniques have successfully been developed to build lasers with frequency stabilities to meet these stringent demands. This is generally not done by directly stabilizing the laser and its environment, but rather by active means whereby a highly stable and environmentally isolated "frequency reference" is created such that the laser emission frequency can be stabilized to the frequency reference. Although a number of techniques currently exist the perhaps best known is the so-called PDH technique named after Pound, Drever, and Hall who pioneered the technique for microwave signals and transferred these developments to laser cavities. The invention disclosed herein applies equally well to all techniques that rely on locking a laser to an etalon. Alternatives to the PDH technique include, but are not limited to, polarization locking (see for example T. W. Hansch, B. Couillaud, "Laser frequency stabilization by polarization spectroscopy of a reflecting reference cavity," Opt. Comm., Vol 35, 3, 441-444, 1980) and tilt locking (see for example B. J. J. Slaggmolen et al. "Frequency Stability of Spatial Mode Interference (Tilt) Locking", IEEE Journal of Quantum Electronics, vol. 38, no. 11, November 2002).

The PDH technique is very robust in many ways, such as stability against intensity fluctuations of the laser. However, it and other techniques like it, suffer from one significant limitation. While the technique works quite well under the relatively stable conditions that can be created in laboratory environments it is not well suited to harsh environments. Essentially the PDH technique involves locking the laser to a very narrow "fringe" in an etalon. Small excursions from the center of the fringe result in error signals that are used to change the laser frequency in such a manner that it brings the frequency back to the center of the fringe. The problem is that the higher the frequency stability requirement, the narrower the fringe has to be. This has the inadvertent effect of reducing the range over which the error signal is valid. As a result, the higher the frequency stability requirement, the easier it is to "kick" the error correcting servo control system out of lock. When that happens a search has to be carried out to find the correct fringe again. During this search time the laser frequency is not stabilized and may not be valid as a clock for the measurement system. To further compound difficulties, it is possible for the servo electronics to lock onto erroneous fringes during the search so that the frequency sought is not the correct frequency.

Under laboratory conditions these problems can typically be dealt with using complex equipment and techniques. However, coherent laser radar and other systems often operate in very difficult conditions where complexity must be avoided and where autonomous operation with high reliability is essential. An example would be a system mounted to a fighter aircraft that subjects the laser to high vibrations, shock, and wide temperature swings, all the while operating in a highly confined space with no possibility of user intervention. Under these conditions it is essential to have a laser that locks itself very reliably and has sufficient smart controls to re-lock itself if the initial lock condition is disturbed.

Multiple etalons have been used with lasers prior to this invention but not for the purpose intended here. For example U.S. Pat. No. 4,947,398 to Yasuda describes a laser that utilizes two etalons inserted into the laser cavity to narrow the width of the laser line. That arrangement of using intra-cavity etalons would not be appropriate for achieving a high degree of frequency control. The Yasuda patent is concerned with lasers that have linewidths on the order of 1 nm. This corresponds to a frequency error on the order of 1,000 GHz, which is typically 8-10 orders of magnitude greater than the frequency stability we are concerned with. Another use of multiple etalons is as "clean-up cavities" prior to locking using e.g. the PDH technique. Clean-up cavities are used to strip small amounts of transverse modes from a main laser mode (normally $TEM_{00}$). Higher order transverse modes represent noise at discrete frequencies and can be stripped off from the laser beam using a high-finesse etalon. As an example, the document "Simulation of Input Optics with LIGO End-to-End Model" by S. Klimenko et al. available at www.phys.ufl.edu/~klimenko/ionote.pdf notes that the pre-cleaning etalon used in the LIGO (Laser Interferometer Gravitational Wave) system acts as a low pass frequency filter with a bandwidth of about 3 kHz.

A need remains in the art for improved apparatus and methods for stabilizing lasers under non-laboratory conditions.

SUMMARY OF THE INVENTION

It is an object of the present invention to provide apparatus and methods for stabilizing lasers under non-laboratory conditions. Such apparatus and methods of use are intended to solve the aforementioned problems.

A specific benefit of the invention is that it provides a means to frequency stabilize a laser to a high degree, under various environmental conditions.

A further specific benefit of the invention is that it provides a means to reestablish a frequency lock if such lock is lost.

A further specific benefit of the invention is to reestablish such lock in a rapid and automatic manner.

Herein the term "etalon" is intended to describe a Fabry Perot interferometer or similar arrangement for providing a resonant transmission or reflection spectrum to an input signal.

The present invention utilizes two etalons, a high finesse etalon and a low finesse etalon, to stabilize the laser. First, the laser is locked to the broader bandwidth of the low finesse etalon. Then, control passes to the high finesse etalon and the laser frequency is locked to the narrower bandwidth of the high finesse etalon. While the laser is locked to the high finesse etalon, the low finesse etalon tracks the laser, so that in the event of loss-of-lock, the low finesse etalon locks the laser close to the frequency at which it was stabilized prior to loss-of-lock. This allows the high finesse etalon to quickly reestablish a narrow bandwidth lock.

The two etalons are arranged in such a manner that their transmission and reflection peaks substantially coincide in frequency. This enables one to lock the laser to the high finesse etalon under normal circumstances. However, when lack of lock is detected control is handed over to the low finesse etalon and its associated servo control system to rapidly bring the laser back to a frequency that is within the lock range of the high finesse etalon, thereby automatically restoring the frequency stability of the laser.

More specifically, the present invention is directed to frequency stabilizing apparatus including a laser to be stabilized for generating an initial laser beam. A frequency changing actuator changes the frequency of the laser beam in response to laser frequency control signal.

A beam splitter system produces a first split beam and a second split beam from the initial laser beam. A first servo system incorporating a low finesse etalon (LFE) uses the first split beam to produce a first error signal in response to the LFE indicating a drift in the initial laser frequency, and a second servo system incorporating a high finesse etalon (HFE) uses the second split laser beam to produce second error signal in response to the HFE indicating a drift in the initial laser frequency. A detector determines whether the second error signal is valid and outputs an enable signal when the second error signal is valid.

A control system receives the first and second error signals and the enable signal and outputs a laser frequency control signal to alter the frequency of the laser in such a direction that at least one of either the first or second error signal drives the laser toward the closest lock point. If the closest lock-point is outside the maximum range of the actuator, then the actuator will be driven by the servo to its limit. This condition can be automatically detected, as by a window comparator, and used to issue a reset command to the actuator, for example, resetting the actuator to the center of its range, or to a previously programmed setpoint. Importantly, no matter where the actuator is sent upon being reset, at least one of the error signals will always indicate the direction of the closest lock point, preferably one or more orders away from the one beyond the range of the actuator that prompted the reset.

Preferably the control system produces the frequency control signal based on the second error signal when the enable signal is present and produces the frequency control signal based on the first error signal when the enable signal is not present.

In a preferred embodiment, at least one of either the first or said second servo systems utilizes PDH locking to produce the first or said second error signals. The enable signal may be produced by detecting the presence of a transmission of a third laser beam through the HFE above a predetermined power threshold.

Preferably the LFE and the HFE are constructed such that they experience substantially the same environments. For example, they might be formed from a substantially monolithic block of material.

Preferably the LFE and the HFE have transmission spectra that substantially overlap in frequency. Generally the transmission spectrum of the LFE and/or the HFE is alterable in response to an etalon calibration signal that causes the two transmission spectra to substantially overlap.

In another preferred embodiment, a frequency-doubling device is inserted between the laser and the beam splitting system to convert a fraction of the initial laser beam into a frequency-doubled beam. In this case the beam splitting means is dichroic such that the first split laser beam has substantially twice the frequency of the second split laser beam.

The steps of a method for stabilizing a laser are as follows:

Outputting an initial laser beam whose frequency is to be stabilized;

Splitting the initial beam into first and second split laser beams;

Directing the first split laser beam to a first frequency reference system having a wide locking range and defining a first frequency reference, the first reference system outputting a first error signal based upon a comparison between the laser frequency and the first frequency reference;

Directing the second split laser beam to a second frequency reference system having a narrow locking range and high frequency resolution, and defining a second frequency reference, the second reference system outputting a second error signal based upon a comparison between the laser frequency and the second frequency reference;

Detecting whether the second error signal is valid and controlling the frequency of the laser using the second error signal when it is valid;

Switching control to the first frequency reference servo when the second error signal is not valid;

Shifting the frequency of the laser using the first error signal until said second error signal becomes valid; and then Switching control to the second frequency reference servo.

BRIEF DESCRIPTION OF THE DRAWINGS

FIG. 6a is an exploded view and FIG. 6b is a non-exploded view.

FIGS. 8a and 8b are perspective views showing embodiments wherein one of the etalons is calibrated. FIG. 8a shows calibration accomplished by use of a different material in one of the etalons and FIG. 8b is an exploded view showing calibration accomplished by physically affecting one of the etalons.

DETAILED DESCRIPTION OF THE INVENTION

Figure 1A:
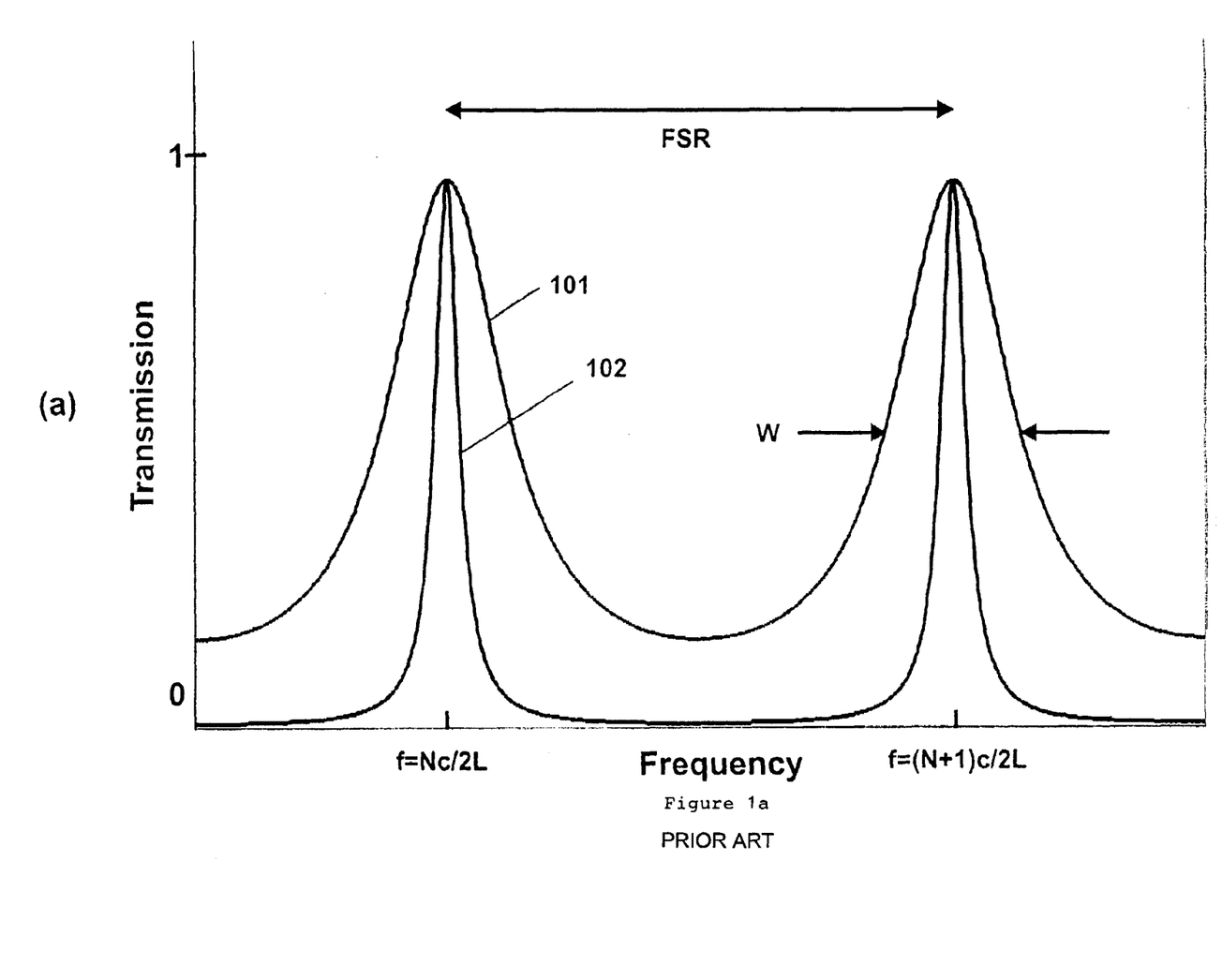
FIG. 1a (Prior art) is a plot showing transmission spectra of etalons with high and low finesse and reflectivity.

We now describe the invention with reference to the attached figures. To aid in understanding we begin with a discussion of frequency locking in the context of prior art and the use of etalons. Refer to FIGS. 1a, 1b, 2, and 3 (all prior art). A simple etalon (not shown) generally comprises two mirrors with reflectivity R placed with a spacing L apart and with the reflective surfaces perpendicular to an incident laser beam. In this configuration the etalon transmits and reflects light at various frequencies as illustrated in FIG. 1a. Any such etalon shows a transmission spectrum that is periodic with a period equal to the free spectral range (FSR) given by the expression FSR=c/2 L. The order of the etalon is an integer multiple N of the FSR as indicated. Curve 101 shows the transmission spectrum for an etalon having a relatively low finesse F, while curve 102 shows the transmission spectrum for an etalon having a higher finesse. We refer in the future to these types of etalons as HFE and LFE to indicate high and low finesse respectively. The finesse is related to the reflectivity R of the mirror coating (assuming no additional losses and that both mirrors have the same coating) through the expression $F=\pi\sqrt{R}/(1-R)$ and also approximately equals the ratio of the FSR to the width of the transmission line W when F is large. From this it is evident that a high reflectivity coating produces a high finesse, which in turn produces a narrow transmission line near the multiples of the FSR. In general the idea behind frequency stabilizing lasers with etalons is to control the frequency of the laser in such a manner that it coincides with the center of one of the peaks. If the etalon is carefully stabilized and insulated against perturbations in temperature or mechanics it acts as a reference against which the frequency of the laser can be controlled.

Figure 1B:
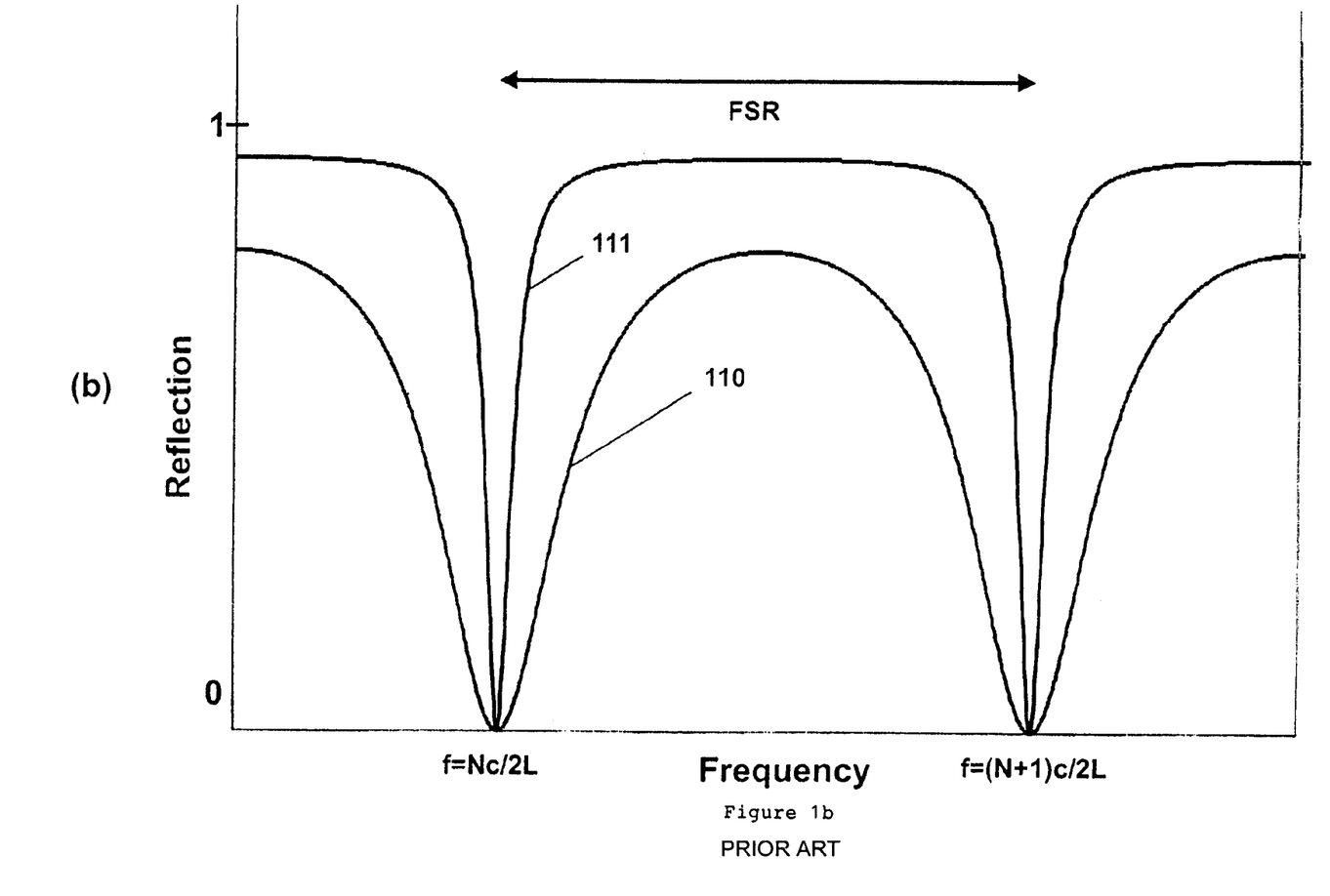
FIG. 1(b) is a plot showing reflectivity spectra of etalons with high and low finesse and reflectivity.

Since the etalon is assumed to be essentially without losses, the reflectivity $R_e$ of the etalon is given by the expression $R_e=1-T_e$, where $T_e$ is the transmissivity shown in FIG. 1a. FIG. 1b shows as lines 110 and 111 the reflectivity spectra corresponding to the transmission spectra shown in FIG. 1a. An additional important feature is that light that is reflected from the etalon near the center of an order experiences a dispersive phase shift. This phase shift as a function of frequency, as measured by the PDH system, is illustrated schematically in FIG. 2 for the LFE (line 201) and the HFE (line 202). As can be seen, the phase shift is such that it is positive for frequencies that are lower than then center and negative for higher frequencies. It can also be seen that the relative width (fraction of the FSR) over which the phase varies significantly is greater for the LFE than for the HFE.

Numerous methods have been developed to stabilize laser frequencies using etalons with varying degrees of complexity and success. Simple versions use the fact that a single HFE can be operated with a photodetector behind the etalon and a servo system to maximize the amount of detected light transmitted through the etalon. Such methods generally suffer from problems that make them unsuitable for stabilizing frequencies to a high degree of precision. For example, it is impossible to distinguish a reduction in detected light that is due to a reduction in laser power, from a drift in frequency away from the center, so this approach is sensitive to intensity variations of the laser. In addition, in an etalon with a very high finesse, such as >10,000, light is reflected many times between the mirrors and the transmitted light is therefore dependent on the light that entered the etalon at an earlier time. This effectively acts as a low pass frequency filter that prevents one from controlling high frequency fluctuations.

A far superior method is the Pound-Drever-Hall (PDH) locking technique. The idea is to send a sample of the laser beam through a phase modulator driven at a frequency $f_m$ that exceeds the width W of a subsequent etalon. The phase modulator imposes sidebands on the laser frequency so that what is incident on the etalon is not just the central laser frequency $f_0$ but also frequencies $f_0-f_m$ and $f_0+f_m$. Under normal circumstances this pure phase modulation produces no modulation of the laser beam amplitude. However, when $f_0$ is in the dispersive phase shift region and the phase modulated beam is reflected from the etalon, the mixing of reflected sidebands with the phase shifted center frequency (carrier) causes the resultant signal to be amplitude modulated at $f_m$. The key to operating a PDH locked laser is that the phase of the modulation leads or lags the modulation signal applied to the phase modulator depending on whether the laser frequency is higher or lower than the etalon center frequency. Detecting the lead or lag then provides a simple method for building a servo that shifts the laser frequency up or down depending on the sign of this error signal.

Figure 2:
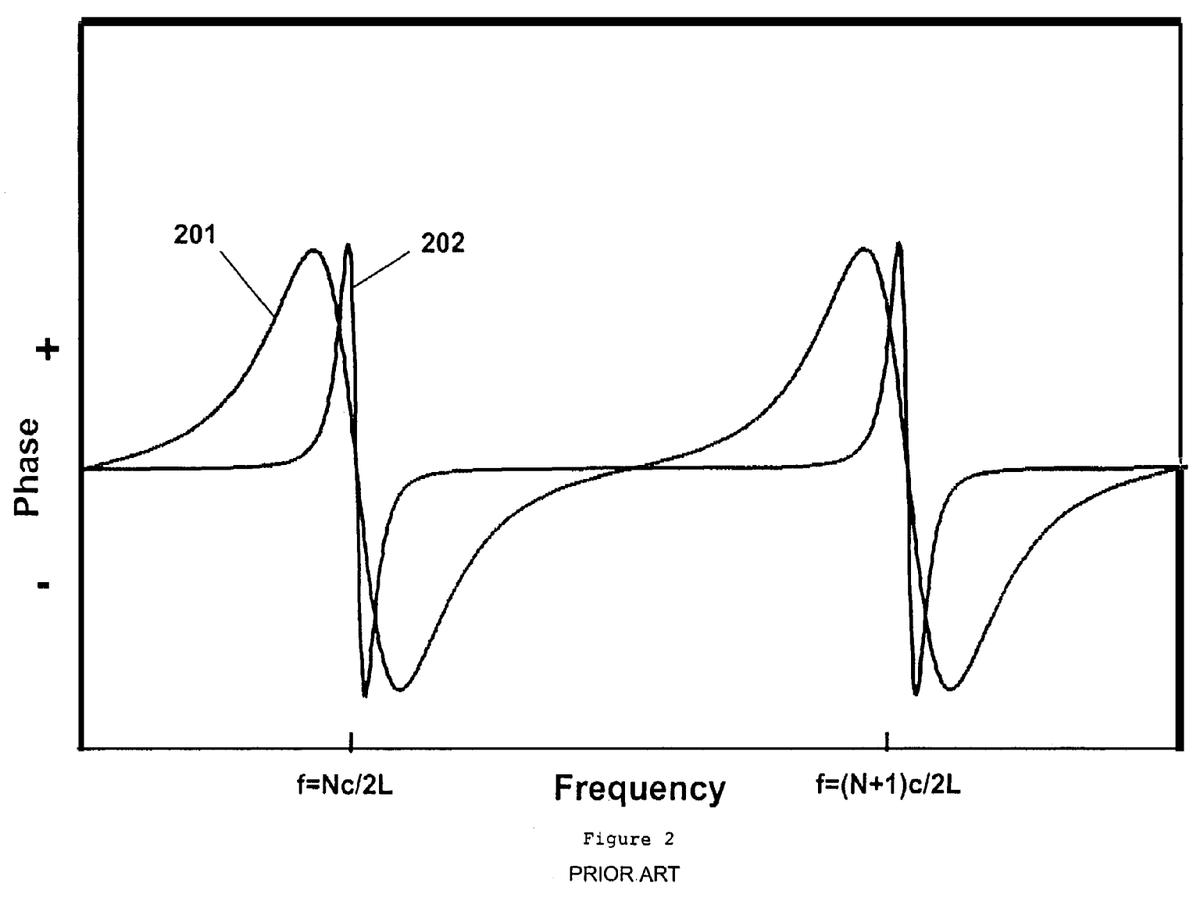
FIG. 2 (Prior art) is a plot illustrating the reflected phase as a function of frequency for etalons with high and low finesse.
Figure 3:
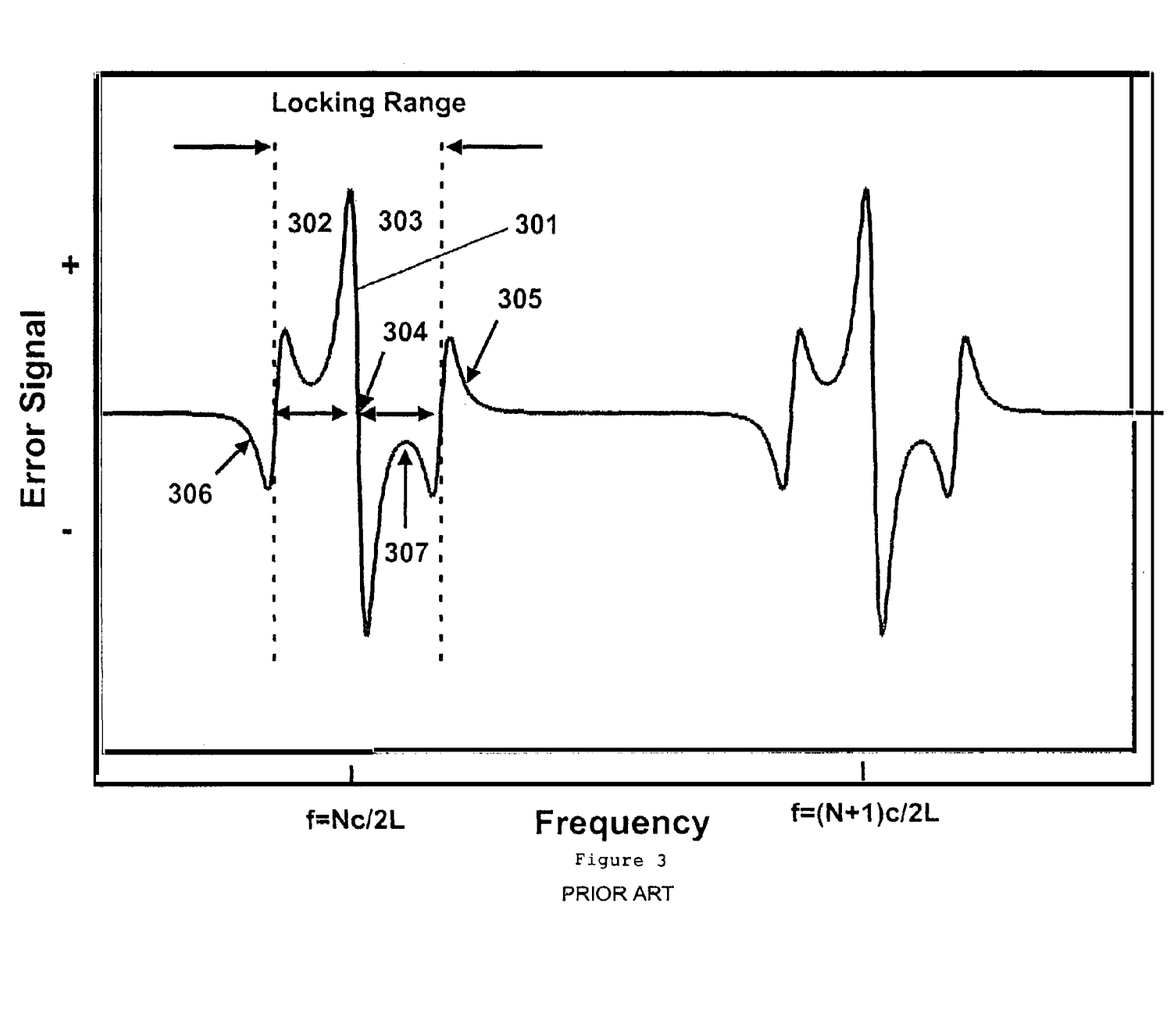
FIG. 3 (Prior art) is a plot showing an idealized error signal as a function of frequency for a PDH system.

The general form of the error signal generated in the PDH locking technique is shown in FIG. 3 as curve 301. In real situations the error signal often has a more complex shape, including the presence of additional sidebands, however the exact shape of the error signal is not essential to operation of the invention in the prescribed manner. The purpose of the servo circuitry is to drive the laser frequency to point 304 (the "lock point"), which can be done because the error signal is positive in region 302 and negative in region 303. In this case the presence of a positive error signal indicates that the laser frequency should be shifted to a higher value in order to reach the lock point, whereas a negative error signal indicates that the laser frequency should be shifted to a lower vaue. The difference between the actual laser frequency and the lock point is often referred to as the amount of "detuning". The total lock band of this arrangement is indicated by the arrows and is substantially equal to twice the modulation frequency applied to the modulator. The additional features 305 and 306 of the curve in comparison with the phase response curve in FIG. 2 are due to the presence of the modulation sidebands. The shape of this curve also indicates some of the limitations of the conventional PDH locking techniques. Locking to a well-defined frequency suggests that a high finesse etalon should be used. That, however, narrows the locking range as a fraction of the FSR. One could then increase the frequency of the modulation to spread the sidebands apart and thereby keep the locking band wide. However, that causes the dip indicated by 307 to deepen and eventually reach zero or the noise level of the system. If, as an example, the modulation frequency is 10 MHz and the etalon free spectral range is 10 GHz, the fractional range over which locking can take place is only 0.1% of the FSR. Additional problems occur with the conventional approach. It is inevitable that the etalon resonates not only the fundamental etalon cavity transverse mode but that weaker transverse modes are also excited. These give rise to additional error signal signatures and a search algorithm that relies only on a single signature as illustrated in FIG. 3 may inadvertently lock onto a spurious signal resulting from a higher order mode.

Figure 4:
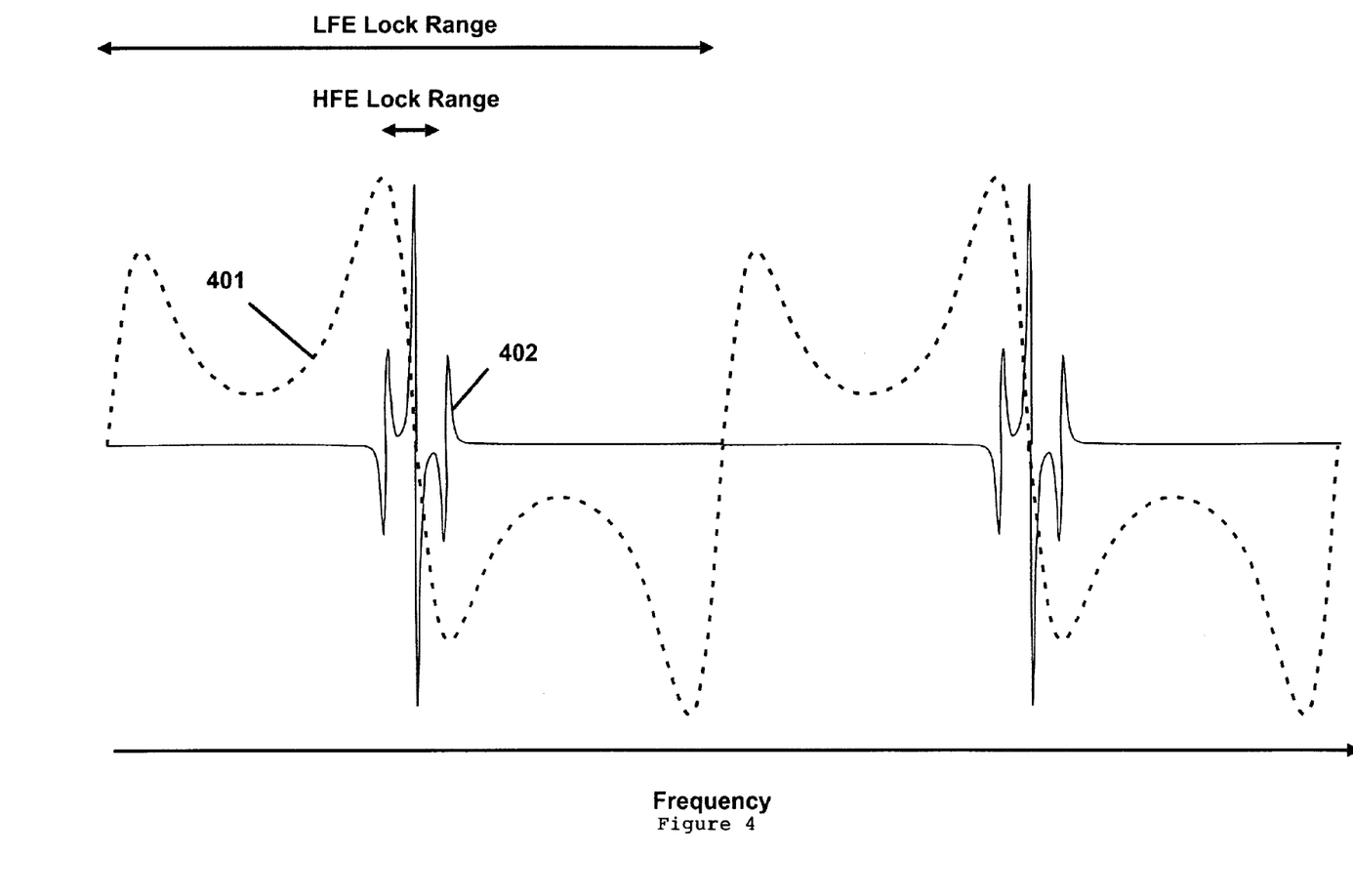
FIG. 4 is a plot showing an error signal as a function of frequency for two different etalons and modulation frequencies, according to the present invention.

Turning now to the present invention, apparatus and methods for stabilizing lasers using two etalons is shown in FIGS. 4, 5, 6a, 6b, 7, 8a, and 8b. The fundamental basis of the present invention is the use of two etalons with different finesses to arrange things in such a manner that we can achieve both high frequency fidelity and a very wide lock band. FIG. 4 illustrates the concept in terms of error signals that may be produced by two different etalons operating on the same laser beam. In FIG. 4 dashed line 401 corresponds to the error signal from a low finesse etalon when a modulation frequency equaling substantially one half of the free spectral range is used. As can be seen the lock range (denoted by "LFE Lock Range") in this case covers the entire FSR and there would be no circumstance under which the proper error signal would not be received, regardless of the actual laser frequency. It is clear that there is an ambiguity in which etalon order is producing the error signal, but this is frequently not of importance. On the other hand this curve also does not have a very sharp slope where it crosses from positive to negative values. Noise is present in all systems which would have the effect of further blurring the exact zero crossing point, which would in turn reduce the frequency stability of the laser. Line 402 in FIG. 4 corresponds to the error signal when a higher finesse etalon is used in conjunction with a reduced modulation frequency. The drawback with this error signal response is, as has been pointed out above, that the lock range (denoted by "HFE Lock Range") is far narrower than for curve 401. On the other hand the zero-crossing point is far more well defined. The present invention comprises apparatus that incorporates both of these error signal response functions, resulting in a frequency stabilization system that has both a very wide locking range and a sharp zero-crossing point for frequency stabilization.

Figure 5:
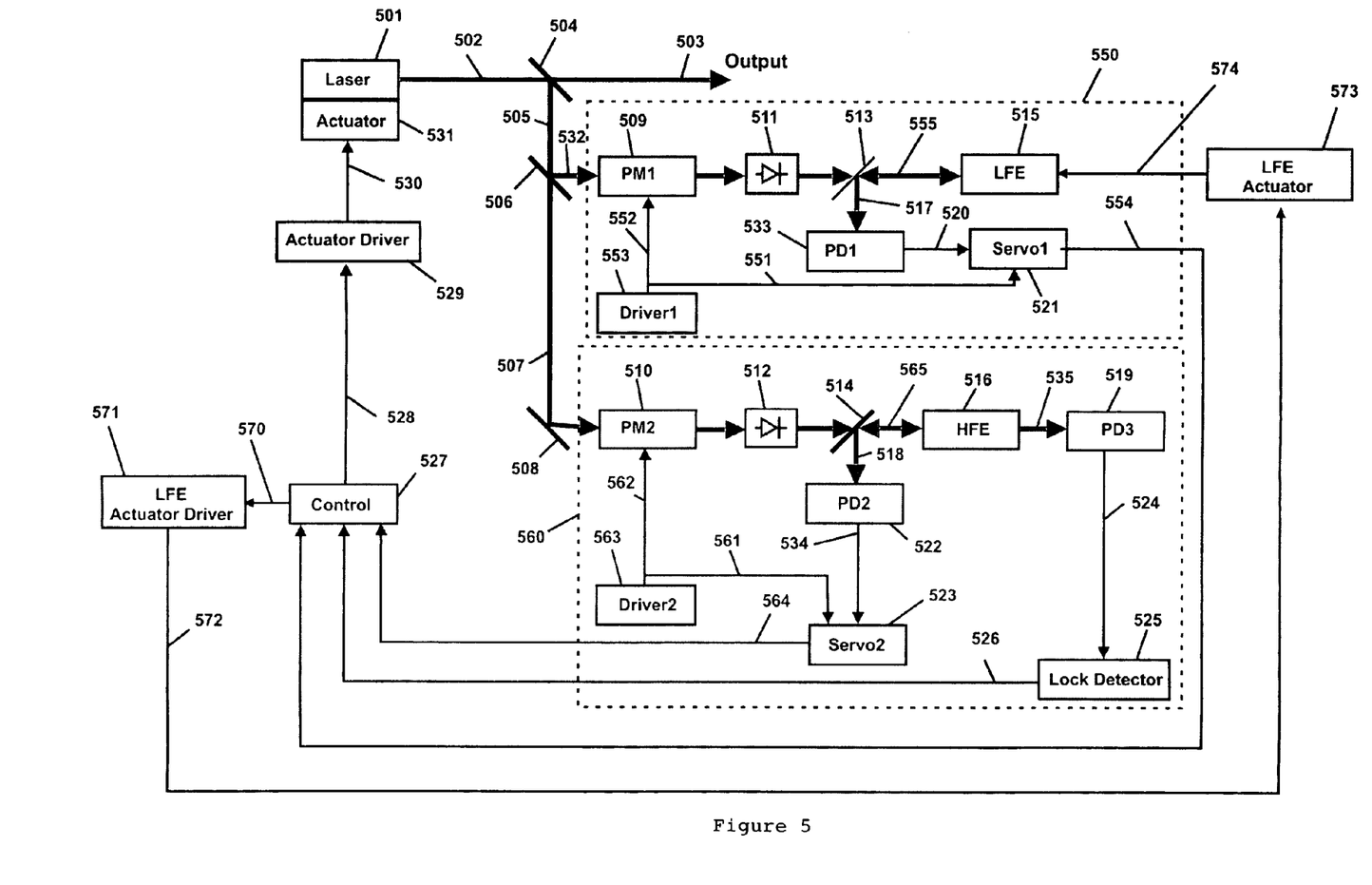
FIG. 5 shows an implementation of the preferred embodiment of the invention.

FIG. 5 illustrates a first preferred embodiment of the invention. The laser 501 to be stabilized produces an initial laser beam 502 that is sent through a partially reflecting mirror 504 to produce an output beam 503 and a reflected beam 505. Reflected beam 505 is in turn split by beam splitter 506 into a transmitted beam 507 and a reflected beam 532.

Beam 532 enters a coarse frequency stabilization system 550 and is first sent through a first phase modulator 509 that imposes sidebands at a modulation frequency $f_{m1}$. The modulation is imposed through a frequency driver 553 that sends a modulation signal at frequency $f_{m1}$ on line 552 to modulator 509. After exiting phase modulator 509 beam 532 is sent through a Faraday isolator 511 and further to a low finesse etalon (LFE) 515. Light 517 reflected from LFE 515 is split off using mirror 513 and directed to a first photo detector (PD1) 533. The electrical output signal 520 is sent to first servo (Servo1) 521. First servo 521 also receives a synchronous modulation signal 551 from driver 553 such that the relative phase between signals 551 and 520 can be compared. This phase difference constitutes the basis for the first servo error signal that is output on line 554 to control unit 527.

Similarly, transmitted beam 507 is directed using optic 508 into a fine frequency stabilization system 560. Beam 507 is first sent through second phase modulator (PM2) 510 that imposes sidebands at a modulation frequency $f_{m2}$. This modulation is imposed through a frequency driver 563 that sends a modulation signal at frequency $f_{m2}$ on line 562 to modulator 510. Beam 507 continues through second Faraday isolator 512 and to high finesse etalon (HFE) 516. Light 518 reflected from HFE 516 is split off using optic 514 and is detected using second photo-detector (PD2) 522. Electrical signal 534 from PD2 522 is sent to second servo (Servo2) 523 and its output signal 564 is also sent to control unit 527. Second servo 523 also receives a synchronous modulation signal 561 from driver 563 such that the relative phase between signals 561 and 534 can be compared. This phase difference constitutes the basis for the second servo error signal that is output on line 564 to control unit 527.

Light 535 transmitted through HFE 516 is detected with third photo-detector (PD3) 519 and its output 524 is sent to lock detector 525. Presence of light on this detector above a predetermined threshold is an indication that the HFE 516 is transmitting light, which is in turn an indication that the laser frequency is close to the desired center of the HFE locking range. Lock detector 525 output 526 is then sent to control unit 527 and is used as an indication that the HFE servo is within its control range.

The action taken by control unit 527 is determined by factors that we will describe and results in a signal 528 being sent to an actuator driver 529 that sends an actuator signal 530 to actuator 531 that is in turn connected to laser 501 in such a manner that a suitable parameter of the laser 501 can be altered in a way that shifts the frequency of laser 501 up or down.

Phase modulator 511 produces a modulation frequency $f_{m1}$ that may be the same as modulation frequency $f_{m2}$, but is generally selected to be much higher than $f_{m2}$. As noted $f_{m1}$ is preferably selected to substantially equal one half of the LFE free spectral range. For example $f_{m1}$ may be in the range of 100-10000 MHz, while $f_{m2}$ may be chosen to be in the range of 10-100 MHz. Low finesse etalon 515 also has a substantially lower finesse than high finesse etalon 516. For example, the finesse of LFE 515 may be in the range of 10-1000, while the finesse of HFE 516 may be in the range of 10,000-100,000 or higher.

An important feature of the invention is that the fringes of the two etalons substantially overlap at least locally; such that a transmission peak that one wishes to lock the laser to using the HFE is also a transmission peak of the LFE. It is therefore important that the two etalons are very well matched and behave the same way in the presence of disturbances, for example due to changes in temperature or pressure. It is not generally important if the frequency of the transmission peaks drifts as long as the two transmission peaks drifty by substantially the same amount. The acceptable amount of such drift is dependent upon the degree of acceptable frequency drift of the laser. For example, if a frequency drift of 1 kHz in 1 ms is acceptable for the laser then the environment has to be controlled in such a manner that the peak does not drift by more than this amount in the required time interval. On the other hand it may be quite acceptable if the peak drifts by 1 MHz over a 10 second interval. In order to ensure that drifts are common to both etalons it is desirable that they be made of a monolithic construction and be relatively small, as will be discussed further below.

When the laser is locked to the HFE 516 the servo 523 produces no error-correcting signal to control unit 527. Under such conditions the actuator driver 529 is in a locked state and holds the laser 501 at the desired frequency. When an error signal is produced by servo 523 the control unit sends an appropriate signal to driver 529, which in turn sends a signal to actuator 531 in order to alter the frequency of laser 501 in a manner that reduces the error signal to zero. Also when the laser is locked or within the lock-band of the HFE 516 a portion of the laser beam is transmitted to photo-detector 519. A signal on PD3 therefore indicates that the laser is being controlled by servo 523.

If there is no signal on photo-detector 519 it indicates that the lock has been lost, which is indicated by the absence of a valid lock signal 526. At that point control unit 527 shifts control from Servo2 to Servo1 and uses the low finesse etalon and Servo1 to re-acquire lock. Because the finesse of LFE 515 is low the lock band of Servo1 can be designed to cover essentially an entire free spectral range. As a result Servo 1 will not normally encounter a condition when is it not receiving a correct error signal to drive the frequency of the laser 501 towards the center frequency of the LFE. Exceptions can occur. For example, if the center frequency of the LFE lies beyond the tuning range of the actuator, a reset to a different part of the tuning range, for example the center, may be desired. Detecting a condition when the end of the tuning range is near may be accomplished using a variety of common techniques. On such technique uses a window comparator to issue a reset command automatically. Since lock detector 525 continuously monitors transmission of HFE 516, once such transmission occurs the control system detects that the laser frequency is within the lock band of Servo 2 and passes control of the system back from Servo 1 to Servo 2.

The essential function of control unit 527 is consequently to switch control between the two servo systems and to output the actuator drive signal 528. This can be accomplished in many ways. A primary requirement is that the control unit knows at any given time which servo should be controlling the laser frequency so that it can shift control between the two servos as required. This means that the lock detection system on second servo plays an important part and that an accurate lock detection signal is produced.

Control unit 527 may obviously be designed with further functionalities, for example to incorporate calibration procedures and to initiate lock from cold starts. When the system is first turned on it is highly unlikely that the laser happens to produce a signal within the HFE lock band. It is then obvious that one would use the LFE to produce the initial lock and then pass control to the HFE lock servo.

Figure 8A:
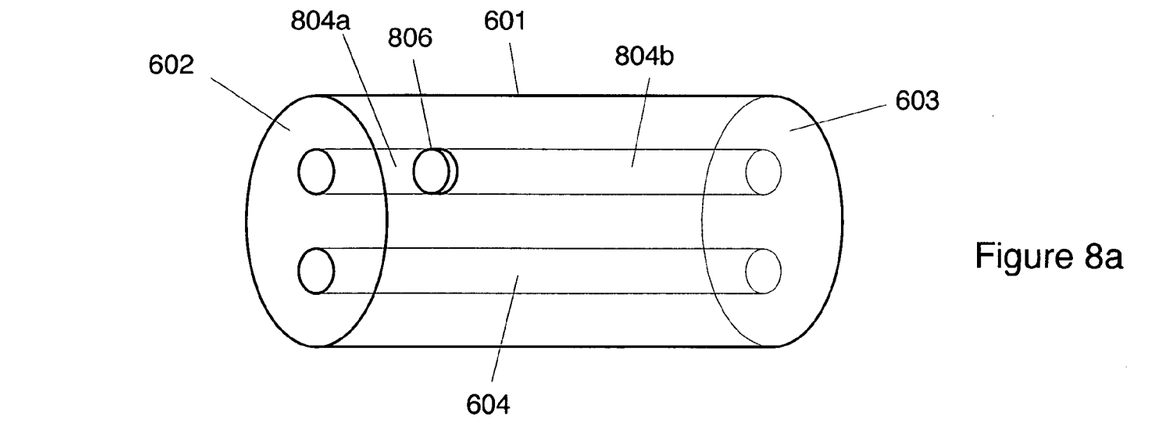
Figure 8B:
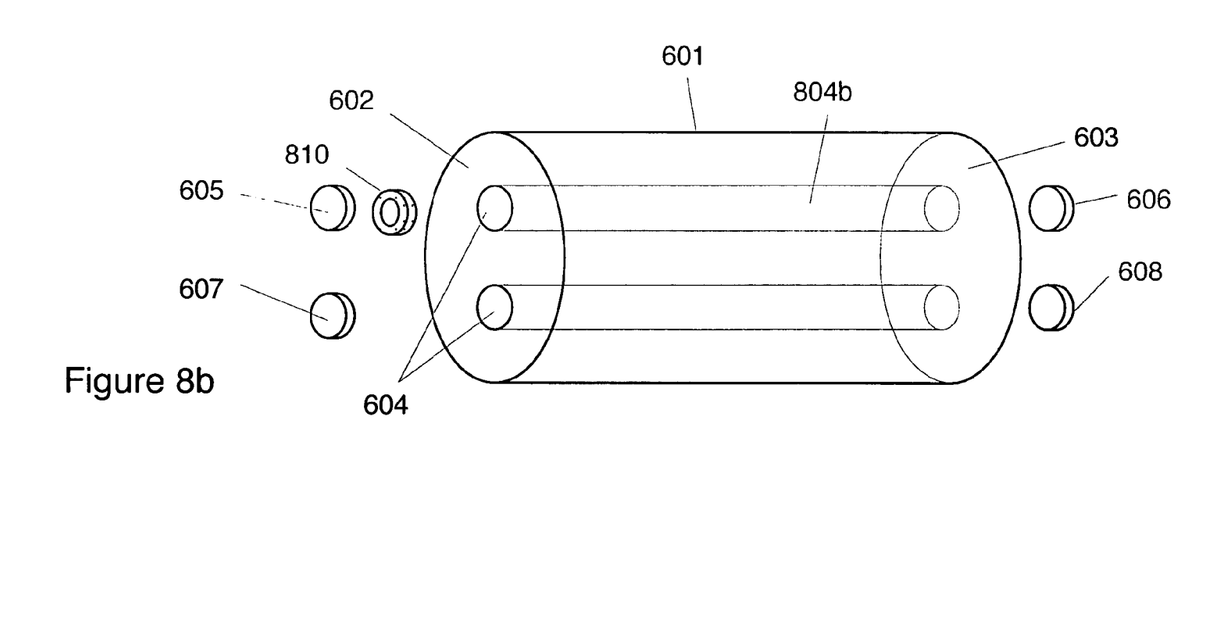

Real-time calibration of the etalons is frequently desired in order to assure that the transmission spectra of the two etalons substantially overlap. An example of a calibration procedure is the following. When Servo2 523 controls laser 501 (as it generally will), control signal 570 causes LFE Actuator Driver 571 to generate a signal 572 to drive LFE Actuator 573. LFE Actuator 573 calibrates LFE 515 via calibration signal 574. This calibration keeps LFE 515 locked to Laser 501 and HFE 516 so that when loss-of-lock does occur, and LFE 515 takes over controlling the laser frequency, the laser frequency will be locked very near its frequency prior to loss-of-lock. Thus the LFE spectrum can be kept continually locked to the HFE spectrum to ensure that when Servo2 loses lock, operation of Servo1 always produces an error signal that drives the system towards the locking range of Servo2. FIGS. 8a and 8b show examples of mechanisms for calibrating LFE 515.

In the above description elements 513 and 514 have been described as mirrors. The simplest configuration would be to have these elements coated using conventional thin-film techniques to partially reflect and partially transmit incident light. A more efficient use of available laser power would be to replace each of the elements 513 and 514 by a combination of a polarizing beam splitter (PBS) and a quarter-wave plate (QWP). This is common practice in optical systems to achieve a low degree of loss. When this is done one arranges for the incident light to have a linear polarization state oriented such that substantially all of the light is transmitted through the PBS. After transmission through the QWP the light becomes circularly polarized. Light reflected from the corresponding etalon becomes linearly polarized at 90 degrees to the incident light after a second pass through the QWP. As a result substantially all of the light is reflected from the PBS in the direction of the detector PD1 or PD2, with very low loss of light power. Use of a Faraday rotator or a device of similar functionality will accomplish the same increase in efficiency.

It is obvious to those skilled in the art that a number of different methods can be used to slightly alter the frequency of laser 501 in response to a control signal input. A number of actuators 531 are consequently possible and proper operation of the invention does not rely on the use of a specific actuator or method of tuning the laser. The actuator and method used will depend on the specific laser under consideration and implementation of the invention is not relying on a specific method. Semiconductor diode lasers, for example, change frequency if the temperature of the laser junction is altered. Such a temperature change can be affected by simply changing the electrical current through the junction. As a result, in this case the actuator would be a current driver. In the case of a diode-pumped solid-state laser frequency changes can be effected by changing the amount of pump power applied to the solid-state laser, or it could be effected by mounting one end mirror to an electrically actuated piezoelectric translator (PZT) to thereby alter the length of the laser cavity.

Faraday isolators 511 and 512 shown in FIG. 5 do not form an essential part of the invention but are included because it is frequently found that proper isolation against weak reflected laser beam feedback is required in stabilizing lasers. The location of isolators is also not critical to the operation of the invention. Proper location of isolators instead forms an integral part of designing the entire system.

Etalon Construction

Numerous ways exist to design a dual etalon of the required type and variations are obvious to those skilled in the arts. As noted the primary requirements are that:

a) the transmission peaks of the two etalons substantially overlap to a sufficient degree that the center of the LFE lock band coincides with the lock band of the HFE, b) the two etalons are constructed in such a manner that both etalons experience substantially the same environment to ensure that once condition a) has been established it does not change over time.

FIG. 6a illustrates an exploded view of one embodiment of a dual etalon. Here a solid length L of a stable material 601, such as sapphire, is used to establish the etalon free spectral range. The length may equal, for example, 2.5 cm, in which case the FSR=6 GHz. Surfaces 602 and 603 are substantially parallel and two holes 604 are bored through the material. Pairs of mirrors (605 and 606 forming one pair, 607 and 608 forming the other pair) are normally attached to surfaces 602 and 603 as illustrated in FIG. 6b, but are shown as separated for clarity in FIG. 6a. In the preferred embodiment coatings are applied to surfaces 609 and 610 that have a moderately high reflectivity in order to form a low finesse etalon. Surfaces 611 and 612 have applied to them high reflectivity coatings in order to form the high finesse etalon. To form a stable etalon the mirrors 605-608 are bonded to spacer 601. As with high finesse etalons normally used for laser frequency stabilization the mirror surfaces 609-612 are normally not flat but rather have a predetermined curvature to increase the stability of the optical modes that propagate in the etalon.

In operation the etalon looks as is illustrated in FIG. 6b. Here the mirrors are bonded to the spacer as described above. Beam 655 is the beam corresponding to beam 555 in FIG. 5 and is incident on etalon mirror 605. This causes a beam 656 to propagate in the etalon, part of which beam is also reflected to the left in the Figure coincident with incident beam 655. Similarly illustrated beam 665 corresponds to beam 565 in FIG. 5. This results in beam 666 propagating in the lower etalon, part of which is also reflected in coincidence with beam 665. The transmitted beam 635 similarly corresponds to transmitted beam 535 in FIG. 5.

In normal use the etalon is contained in a housing to insulate it against environmental changes, such as temperature and pressure variations. This is common practice and is not illustrated in FIG. 6. As part of the insulation active techniques are frequently used, for example employing temperature control circuits to keep the temperature of the etalon assembly constant to the degree necessary for proper operation.

Figure 6:
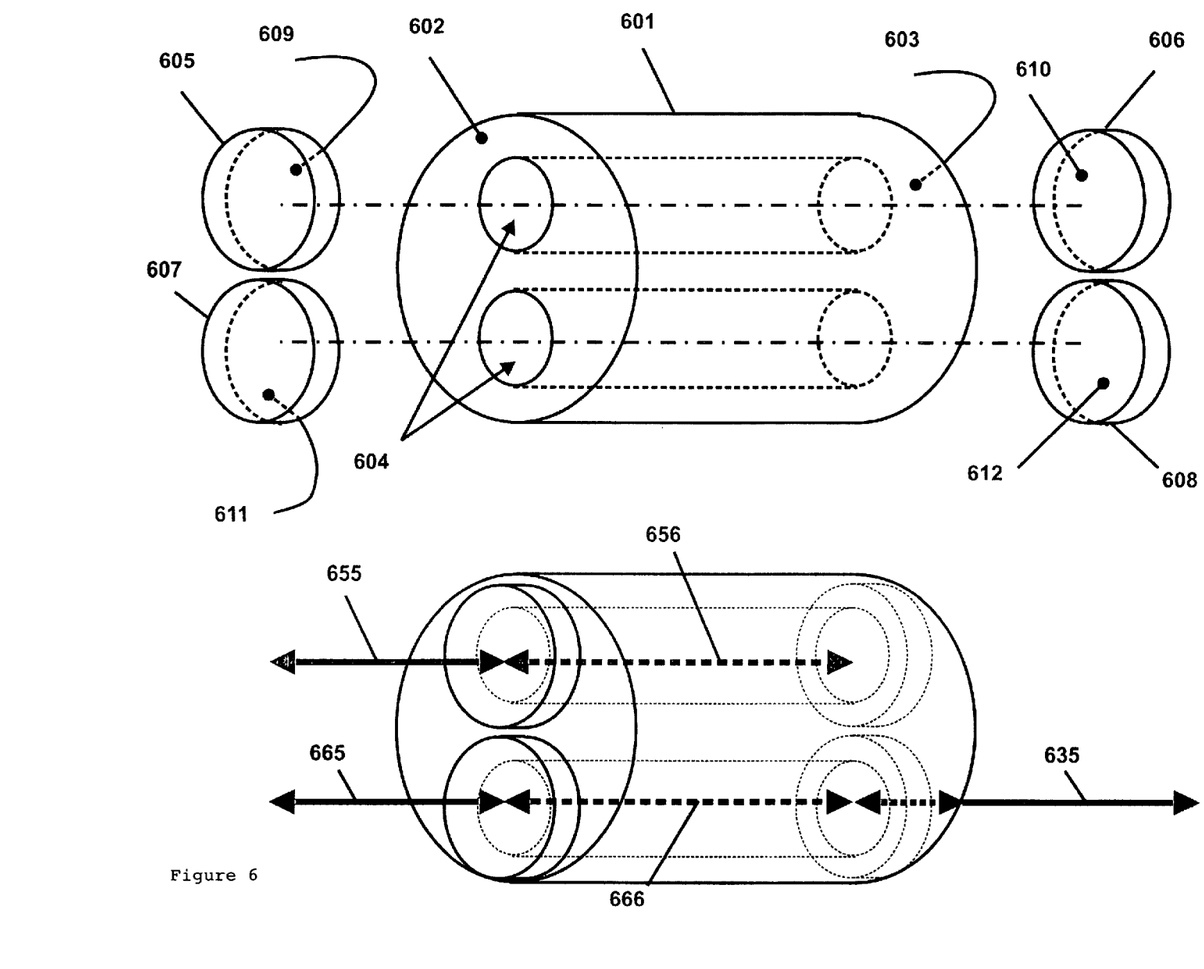
FIGS. 6a and 6b are perspective views showing an exemplary construction of a monolithic etalon with high and low finesse parts.

It is obvious to those skilled in the art that etalons can be constructed in many alternative forms to meet the same purpose. Such alternative construction methods include:

Use of a solid spacer in place of the spacer with two bored holes illustrated in FIG. 6, for example with appropriate coatings applied directly on the ends of the solid etalon.

Evacuation of the etalon using a vacuum system or filling the bored space with an appropriate gas.

Use of optical fibers (including hollow-core fibers and photonic bandgap materials) to guide light, rather than to use free space light propagation within the etalon. Such materials must have a very low attenuation per unit length since the effective length of the etalon is approximately equal to the physical length times the etalon finesse.

Spacer material can be other than sapphire and possibilities include, but are not limited to: silicon carbide (SiC), beryllium (Be), ultra-low expansion (ULE) glass, silicon (Si), and Zerodur.

FIGS. 8a and 8b are perspective views showing embodiments wherein one of the etalons (generally LFE 15) is calibrated. The requirement that the two etalon spectra overlap to a sufficient degree means that the length error between the two etalons must be significantly smaller than one wavelength. This can be difficult to achieve by manufacturing, but it can be easily achieved through active control or calibration means. One exemplary method to accomplish this is to attach an actuator to one of the etalons, preferably the low finesse etalon (LFE), such that its length can be varied by amounts on the order of approximately one FSR. At a wavelength of 1 micrometer this corresponds to requiring an actuator that can alter the length by 0.5 micrometers for an airspaced etalon. This is possible using a number of common techniques.

FIG. 8a shows calibration accomplished by use of a different material in a portion of one of the two etalons (mirrors are not shown) such that they have different coefficients of thermal expansion (CTE). For example portion 804a (capped with mirror 806) might comprise silica, having a CTE of 1 ppm/° C., whereas the rest of etalon 601 might comprise sapphire, having a CTE of 7 ppm/° C. Portions 804b and 604 are generally cavities. The calibration is then accomplished by changing the temperature of the entire dual etalon element 601. LFE 515 is affected differently from HFE 516 because of the difference in CTE. This causes the two transmission spectra to "slide" past each other like two comb patterns and a point can be found where teeth on the two "combs" overlap.

FIG. 8b is an exploded perspective drawing which shows calibration accomplished by physically affecting one of the etalons, for example by attaching one mirror 605 to a piezoelectric translator (PZT) 810. By changing the voltage applied to the PZT the spacing between mirrors 605, 606 can thereby be changed.

An exemplary procedure for calibrating the dual etalon comprises following steps:

1. The laser 501 is operated and tuned such that light is transmitted through the high finesse etalon (HFE) 516. The laser tuning is then stopped and the laser frequency is kept stabilized. At this point the HFE is operated at the desired lock point.

2. Light transmission is monitored through the low finesse etalon (LFE) 515. The actuator, such as the PZT 810 noted above, is then activated and the voltage changed until the transmitted light is substantially maximized. At this point, for the given control voltage to the actuator, the transmission peaks of the two etalons coincide, which is the desired result.

3. The calibration voltage $V_c$ required for the actuator to reach this condition is recorded, for example stored in a computer used to control the laser system. This computer may be part of the control unit 527 discussed in conjunction with FIG. 5.

Optionally, the response of the actuator can be mapped and also stored in the computer. For example, it may be desired to measure the voltage change from $V_c$ required to move the LFE to the next adjacent transmission peak. It may also be desired to record such readings, including $V_c$ as a function of temperature to create a lookup table in the computer, such that for any given etalon housing temperature the voltage values required to set the LFE mirror spacing can be retrieved from computer memory and applied to the actuator.

Alternative Embodiment

Figure 7:
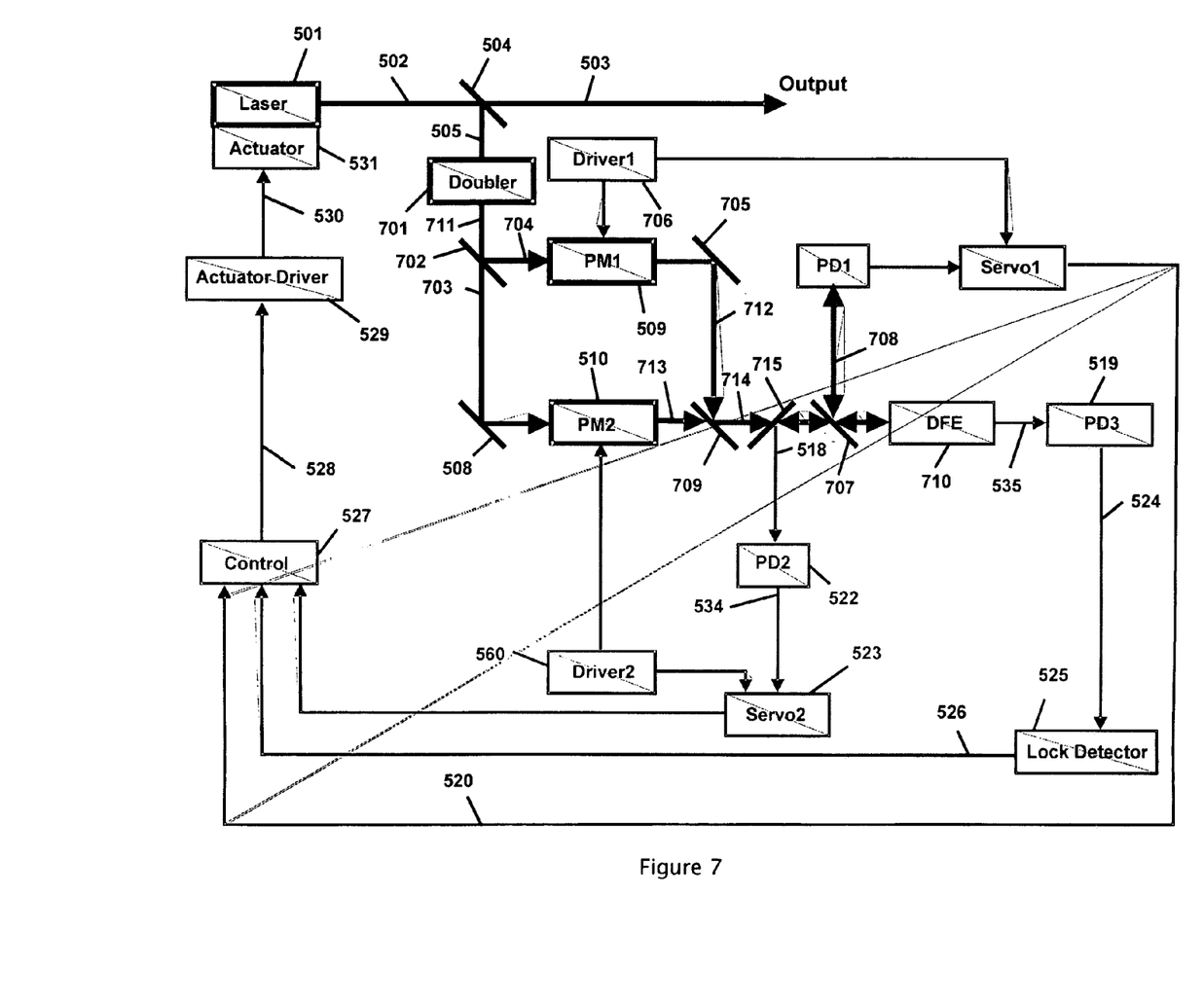
FIG. 7 is a block diagram illustrating an alternative embodiment of the invention using a frequency doubler in conjunction with a single cavity etalon.

The essential feature of the invention is the use of high and low finesse etalons together with suitable servo systems and a control system to pass control between the two servos. Having two physically separated etalons is not in principle required. Configurations that utilize a single etalon to meet the high and low finesse criteria are in principle an improvement since such an arrangement would ensure that there is only one common environment and consequently any changes are experienced by both the low and high finesse measurements. One arrangement that satisfies this criterion is illustrated in FIG. 7. This arrangement relies on the fact that dichroic coatings can easily be fabricated and that the frequency of a laser can be converted to a different frequency using nonlinear optical materials. The technique disclosed below may be advantageously applied to all manners of frequency-shifted beams, but is described in the exemplary context where the laser frequency is doubled through use of a nonlinear frequency doubler. Other frequency converting methods include higher harmonic generation, optical parametric oscillators (OPO), and Raman scattering. Many of the specific elements of FIG. 7 are the same as in FIG. 5 and are referenced with the same numerals. These items will not be described in detail again. In FIG. 7 as in FIG. 5 beam splitter 504 splits the output beam from laser 501 into a transmitted beam 503 and a reflected beam 505. However, in this case a frequency-doubling element 701 is inserted in reflected path 505. This causes beam 711 to be composed of two overlapping beams, one at the main laser frequency $f_0$ and one at twice that frequency or $2f_0$. Dichroic beam splitter 702 separates the two beams into the doubled beam 704 and the $f_0$ beam 703. The doubled beam propagates through phase modulator 509 where frequency sidebands at $+/-f_{m1}$ are applied, and continues as beam 712 to dichroic mirror 709. At the same time main beam 703 is directed through second phase modulator 510 where sideband frequencies of $+/-f_{m2}$ are applied. The resulting phase modulated beam 713 is also incident on dichroic mirror 709, where the two modulated beams are recombined as beam 714. These pass through two beam splitting mirrors 707 and 715 and are incident on dual finesse etalon (DFE) 710. Dual finesse etalon 710 consists of a single pair of etalon mirrors whose coating design is such that the reflectivity is very high at the fundamental frequency $f_0$ and substantially lower at the doubled frequency $2f_0$. Such coatings may be made using conventional thin film techniques. As a result the mirror pair forms a high finesse etalon at the fundamental frequency and a low finesse etalon at the doubled frequency. This meets the criterion of providing a dual etalon device in a single cavity configuration.

Detection of locking conditions and control of the servos is done as previously discussed in the context of FIG. 5. To aid the process dichroic beam splitters are such that 707 transmits substantially all of the light at frequency $f_0$ while being partially reflective at the doubled frequency $2f_0$. Similarly 715 has the opposite properties of being highly transmissive at $2f_0$ while being partially reflective at $f_0$. As noted in the context of FIG. 5 a number of well-known techniques can be used to maximize the efficient use of light power, including use of polarization to minimize beam splitter losses. For clarity we have also omitted optical isolators, such as Faraday isolators, that would frequently be inserted into the optical system to prevent instabilities. Such isolators were illustrated in FIG. 5.

Alternative Locking Techniques

It is also important to note that the invention does not rely on the specifics of the PDH locking technique for operation. PDH locking has been used as an example only because it is a common technique that works well in many situations. As noted in the introduction other methods, such as those relying on locking to the slope of the reflected phase signal in FIG. 2, or methods that use polarization techniques, may also implement the dual etalon technique disclosed here.

While the present invention has been shown and described in the context of specific examples and embodiments thereof, it will be understood by those skilled in the art that numerous changes in the form and details may be made without departing from the scope and spirit of the invention as encompassed in the appended claims.

The invention claimed is:

1. Laser frequency stabilizing apparatus for stabilizing the frequency of a laser based upon an initial beam generated by the laser, the apparatus comprising:

a frequency changing actuator for changing the frequency of the laser in response to a laser frequency control signal;

a beam splitter system for producing a first split beam and a second split beam from the initial laser beam;

a first servo system incorporating—
an input interface for receiving the first split beam as an input,
a low finesse etalon (LFE) having a resonant frequency for generating an LFE response signal responsive to detuning between the first split beam input frequency and the LFE resonant frequency, and
an output interface for outputting the LFE response signal as a first error signal; a second servo system incorporating—
an input interface for receiving the second split beam as an input,
a high finesse etalon (HFE) having a resonant frequency for generating an HFE response signal responsive to detuning between the second split beam input frequency and the HFE resonant frequency,
an output interface for outputting the HFE response signal as a second error signal, and
a detector for determining that the second error signal is valid and outputting an enable signal when the second error signal is valid; and a control system for receiving the first error signal, the second error signal, and the enable signal and for outputting a laser frequency control signal based upon the received signals;

wherein the frequency changing actuator is responsive to the laser frequency control signal and operates to alter the frequency of the laser in a direction such that at least one of either the first error signal or the second error signal indicates that the detuning is decreasing, and wherein at least one of the first servo system and the second servo system includes functionality to utilize one of a PDH locking technique, a polarization locking technique, and a tilt locking technique to produce at least one of the first error signal and the second error signal.

2. The laser frequency stabilizing apparatus of claim 1 wherein the control system includes functionality for producing the frequency control signal based upon the second error signal when the enable signal is present and based upon the first error signal when the enable signal is not present.

3. The laser frequency stabilizing apparatus of claim 1 wherein the detector includes functionality to detect the presence of a transmission of the second split laser beam through the HFE above a predetermined power threshold.

4. The laser frequency stabilizing apparatus of claim 1 wherein the LFE and said HFE are constructed and arranged such that they experience substantially the same environments.

5. The laser frequency stabilizing apparatus of claim 4 wherein the LFE and the HFE are formed from a substantially monolithic block of material.

6. The laser frequency stabilizing apparatus of claim 4 further comprising:
a frequency conversion device between the laser and the beam splitter system for converting the initial laser beam into a first and a second overlapping split beams having two different frequencies;
a first phase modulator for modulating the first split beam; and
a second phase modulator for modulating the second split beam;
wherein the beam splitting system is dichroic so as to provide one of the frequencies to the first phase modulator and the other frequency to the second phase modulator; and
wherein the LFE and the HFE comprise the same physical device, the device operating as an LFE at one of the two frequencies and the device operating as an HFE at the other frequency.

7. The laser frequency stabilizing apparatus of claim 6 wherein the frequency conversion device comprises a frequency-doubling device.

8. The laser frequency stabilizing apparatus of claim 7 wherein the LFE and the HFE comprise optical coatings having different reflectivities at the two different frequencies.

9. The laser frequency stabilizing apparatus of claim 1 wherein the LFE and the HFE have transmission spectra that substantially overlap in frequency.

10. The laser frequency stabilizing apparatus of claim 1, wherein the control system further includes functionality to generate an etalon calibration signal and wherein the transmission spectrum of at least one of either the LFE or the HFE is alterable in response to the etalon calibration signal.

11. The laser frequency stabilizing apparatus of claim 10, wherein the etalon calibration signal causes the transmission spectra of the LFE and the HFE to substantially overlap in frequency.

12. A method for stabilizing the frequency of a laser comprising the steps of:
outputting an initial laser beam whose frequency is to be stabilized;
splitting the initial beam into first and second split laser beams;
directing the first split laser beam to a first frequency reference system having a wide locking range;
generating a first error signal from the first reference system;
directing the second split laser beam to a second frequency reference system having a narrow locking range and high frequency resolution;
generating a second error signal from the second reference system;
detecting whether the second error signal is valid and controlling the frequency of the laser using the second error signal if it is valid;
switching control to the first frequency reference system when the second error signal is not valid;
shifting the frequency of the laser using the first error signal until said second error signal becomes valid; and then
switching control to the second frequency reference system,
wherein at least one of the first error signal and the second error signal is generated using one of a PDH locking technique, a polarization locking technique, and a tilt locking technique.

13. A method for stabilizing the frequency of a laser based upon an initial beam generated by the laser, the method comprising the steps of:
splitting the laser beam into a first split beam and a second split beam;
generating an LFE error signal responsive to the difference between the first split beam input frequency and an LFE reference frequency;
generating an HFE error signal responsive to the difference between the second split beam input frequency and an HFE reference frequency
determining whether the HFE error signal is valid and outputting an enable signal when the HFE error signal is valid;
generating a laser frequency control signal based upon the LFE error signal, the HFE error signal, and the enable signal; and
changing the frequency of the laser in response to the laser frequency control signal.

14. The method of claim 13, wherein the step of generating the control signal generates the control signal based upon the LFE error signal when the enable signal is present and based upon the HFE error signal when the enable signal is not present.

* * * * *